(12) United States Patent
Renollett et al.

(10) Patent No.: US 10,197,181 B2
(45) Date of Patent: Feb. 5, 2019

(54) NON-INERT GAS CERTIFIED ELECTRONIC CONTROLLER

(71) Applicant: TESCOM CORPORATION, Elk River, MN (US)

(72) Inventors: Jacob T. R. Renollett, Andover, MN (US); Eric J. Burgett, McKinney, TX (US)

(73) Assignee: TESCOM CORPORATION, Elk River, MN (US)

( * ) Notice: Subject to any disclaimer, the term of this patent is extended or adjusted under 35 U.S.C. 154(b) by 249 days.

(21) Appl. No.: 15/193,989

(22) Filed: Jun. 27, 2016

(65) Prior Publication Data

US 2016/0377192 A1    Dec. 29, 2016

Related U.S. Application Data

(60) Provisional application No. 62/184,706, filed on Jun. 25, 2015.

(51) Int. Cl.
  *F16K 31/42*   (2006.01)
  *F16K 31/128*  (2006.01)
  (Continued)

(52) U.S. Cl.
  CPC ............... *F16K 31/42* (2013.01); *F15B 5/006* (2013.01); *F15B 20/00* (2013.01); *F16K 31/06* (2013.01);
  (Continued)

(58) Field of Classification Search
  CPC .... F16K 31/42; F16K 31/124; F16K 31/1245; F16K 31/128; F16K 31/06;
  (Continued)

(56) References Cited

U.S. PATENT DOCUMENTS 2,964,051 A     12/1960  Garnett
3,113,432 A  *  12/1963  Watson ................... F16K 31/42
                                                  137/505.42
(Continued)

FOREIGN PATENT DOCUMENTS

CN     2 399 758 Y     10/2000
EP     0 269 805 A2    6/1988
(Continued)

OTHER PUBLICATIONS

International Search Report for Application No. PCT/US2016/039496 dated Oct. 18, 2016.

(Continued)

*Primary Examiner* — R. K. Arundale
*Assistant Examiner* — Jonathan Waddy
(74) *Attorney, Agent, or Firm* — Marshall, Gerstein & Borun LLP (57) ABSTRACT

An electro-pneumatic controller adapted to use a non-inert fluid as a control fluid includes a base portion and a cap portion removeably secured to the base portion. A non-intrinsically-safe process may be disposed within an interior of the cap portion. A plurality of passageways may be disposed through the base portion. The electro-pneumatic controller may also include a flameproof barrier assembly which may include a plurality of flameproof joints each disposed within desired portion of the plurality of passageways. The plurality of flameproof joints cooperate to at least partially define a first zone, the flameproof joints adapted to prevent or to limit the spread of an open fire or explosion that might occur due to the ignition of the non-inert control fluid.

20 Claims, 5 Drawing Sheets

(51) Int. Cl.
*A62C 4/00* (2006.01)
*F15B 5/00* (2006.01)
*F15B 20/00* (2006.01)
*F16K 31/06* (2006.01)
*F15B 11/00* (2006.01)
*G05D 16/20* (2006.01)

(52) U.S. Cl.
CPC .............. *F16K 31/128* (2013.01); *A62C 4/00* (2013.01); *F15B 11/006* (2013.01); *F15B 2211/30575* (2013.01); *F15B 2211/6306* (2013.01); *F15B 2211/86* (2013.01); *F15B 2211/8855* (2013.01); *G05D 16/20* (2013.01)

(58) Field of Classification Search
CPC ..... F16L 55/1108; F15B 11/006; F15B 20/00; F15B 2211/30575; F15B 2211/6306; F15B 2211/86; F15B 2211/8855; F15B 5/06; A62C 4/00; A62C 4/02; G05D 16/20
See application file for complete search history.

(56) References Cited

U.S. PATENT DOCUMENTS

| | | | |
|---|---|---|---|
| 3,334,642 A | | 8/1967 | Borthwick |
| 3,963,048 A | * | 6/1976 | Bowman ................ F16K 11/10 137/596.1 |
| 4,961,441 A | * | 10/1990 | Salter ................ G05D 16/2053 137/14 |
| 5,931,186 A | * | 8/1999 | Skoglund ............. G05D 7/0133 137/486 |
| 6,021,799 A | * | 2/2000 | Price ..................... B05B 7/1404 137/102 |
| 9,846,102 B2 | * | 12/2017 | Tharaldson ........ G05B 23/0256 |
| 2011/0108292 A1 | * | 5/2011 | Moyer ..................... A62C 4/00 169/48 |
| 2014/0352408 A1 | * | 12/2014 | Tharaldson ............. G01M 3/00 73/46 |
| 2014/0358303 A1 | * | 12/2014 | Leonard ............. G05D 16/2093 700/283 |
| 2015/0211552 A1 | * | 7/2015 | Burgett ................ F15B 13/025 137/625.64 |
| 2016/0377104 A1 | * | 12/2016 | Renollett ................ F16B 5/025 411/393 |
| 2017/0199531 A1 | * | 7/2017 | Masias .................. G01L 9/0048 |
| 2017/0368393 A1 | * | 12/2017 | Renollett ............. G05D 16/20 |

FOREIGN PATENT DOCUMENTS

| | | | | |
|---|---|---|---|---|
| EP | 0269805 A2 | * | 6/1988 | ......... G05D 16/2013 |
| EP | 2 101 061 A1 | | 9/2009 | |
| EP | 2101061 A1 | * | 9/2009 | |
| EP | 2 592 519 A1 | | 5/2013 | |

OTHER PUBLICATIONS

Written Opinion for Application No. PCT/US2016/039496 dated Oct. 18, 2016.

* cited by examiner

NON-INERT GAS CERTIFIED ELECTRONIC CONTROLLER

FIELD OF THE DISCLOSURE

This disclosure relates generally to controllers for a process control valve or regulator, and more specifically to electro-pneumatic controllers.

BACKGROUND

Electro-pneumatic controllers (also called electro-pneumatic regulators) are typically used to precisely control the pressure of control fluid used to position a pneumatically-controlled device. For example, an electro-pneumatic controller can be used to control the pressure of control fluid into a pneumatic actuator of a process control valve or regulator to precisely position the process control valve or regulator. The electro-pneumatic controllers may include one or more passageways to receive the control fluid, and one or more solenoid valves may control the flow of the control fluid through the passageway of the electro-pneumatic controllers. The one or more solenoid valves may be in communication with a microprocessor and associated circuitry, and the microprocessor may be in communication with one or more sensors disposed outside of the electro-pneumatic controller (e.g., within an interior portion of the pneumatic actuator of the process control valve or regulator) to provide closed-loop control of the electro-pneumatic controller and/or the process control valve or regulator. The one or more passageways, one or more solenoid valves, and the microprocessor and associated circuitry may all be disposed within a housing that allows the electro-pneumatic controller to act as a modular device. Because inert gas is typically used as a control fluid, there is no danger of the microprocessor or associated circuitry igniting the control fluid.

BRIEF SUMMARY OF THE DISCLOSURE

An electro-pneumatic controller adapted to use a non-inert fluid as a control fluid includes a housing assembly having a base portion and a cap portion removably secured to the base portion, the cap portion having an interior. The electro-pneumatic controller also includes a first solenoid valve coupled to the base portion and disposed at least partially within the interior of the cap portion. The first solenoid valve includes an inlet, an outlet, and a valve member movable between a closed position to an open position. In the closed position, flow from the inlet to the outlet is prevented and in the open position, flow from the inlet to the outlet is allowed. The electro-pneumatic controller further includes a second solenoid valve coupled to the base portion and disposed at least partially within the interior of the cap portion. The second solenoid valve includes an inlet, an outlet, and a valve member movable between a closed position to an open position. In the closed position, flow from the inlet to the outlet is prevented and in the open position, flow from the inlet to the outlet is allowed. The electro-pneumatic controller also includes a processor disposed at least partially within the interior of the cap portion, the processor in communication with the first solenoid valve and/or the second solenoid valve. The processor is adapted to send a command to the first solenoid valve to move from the closed position to the open position or from the open position to the closed position and a command to the second solenoid valve to move from the closed position to the open position or from the open position to the closed position. The electro-pneumatic controller additionally includes an input passageway disposed at least partially through the base portion of the housing assembly. The input passageway has a first end and a second end, the first end is coupled to a source of fluid and the second end is coupled to the inlet of the first solenoid valve. An intermediate passageway is disposed at least partially through the base portion of the housing assembly, and the intermediary passageway has a first end and a second end, the first end being coupled to the outlet of the first solenoid valve and the second end being coupled to the inlet of the second solenoid valve. An outlet passageway is disposed at least partially through the base portion of the housing assembly, and the outlet passageway having a first end and a second end, the first end of the outlet passageway being coupled to the intermediate passageway and the second end of the outlet passageway adapted to be coupled to a pneumatic actuator. An exhaust passageway is disposed at least partially through the base portion of the housing assembly, the exhaust passageway having a first end and a second end, the first end being coupled to the outlet of the second solenoid valve and the second end being coupled to atmosphere. The electro-pneumatic controller additionally includes a flameproof barrier assembly including a plurality of flameproof joints. More specifically, a first flameproof joint is disposed within the input passageway, a second flameproof joint, is disposed within the outlet passageway, and a third flameproof joint is disposed within the exhaust passageway. The plurality of flame proof joints cooperating to at least partially defining a first zone, the flameproof joints being adapted to prevent or to limit the spread of an open fire or explosion that might occur due to the ignition of the non-inert control fluid.

A method of converting an electro-pneumatic controller having non-intrinsically safe electronics to use a non-inert fluid as a control fluid is disclosed. The electro-pneumatic controller includes a housing assembly having a base portion and a cap portion removably secured to the base portion, a first solenoid valve and a second solenoid valve each coupled to the base portion and disposed at least partially within an interior of the cap portion, each of the first and second solenoid valves having an inlet, an outlet, and a valve member movable between a closed position and an open position, and a non-intrinsically safe processor disposed within the interior of the cap portion and in communication with each of the first and second solenoid valves. The method includes positioning a first flameproof joint within an input passageway, the input passageway disposed at least partially through the base portion and having a first end coupled to a source of the non-inert fluid and a second end coupled to the inlet of the first solenoid valve. The method also includes positioning a second flameproof joint within an outlet passageway, the outlet passageway disposed at least partially through the base portion and including a first end coupled to an intermediate passageway and a second end adapted to be coupled to a pneumatic actuator, wherein the intermediate passageway is disposed at least partially through the base portion and includes a first end coupled to the outlet of the first solenoid valve and a second end coupled to the inlet of the second solenoid valve. The method additionally includes positioning a third flameproof joint within an exhaust passageway, the exhaust passageway disposed at least partially through the base portion and including a first end being coupled to the outlet of the second solenoid valve and a second end being coupled to atmosphere.

DETAILED DESCRIPTION

Figure 1:
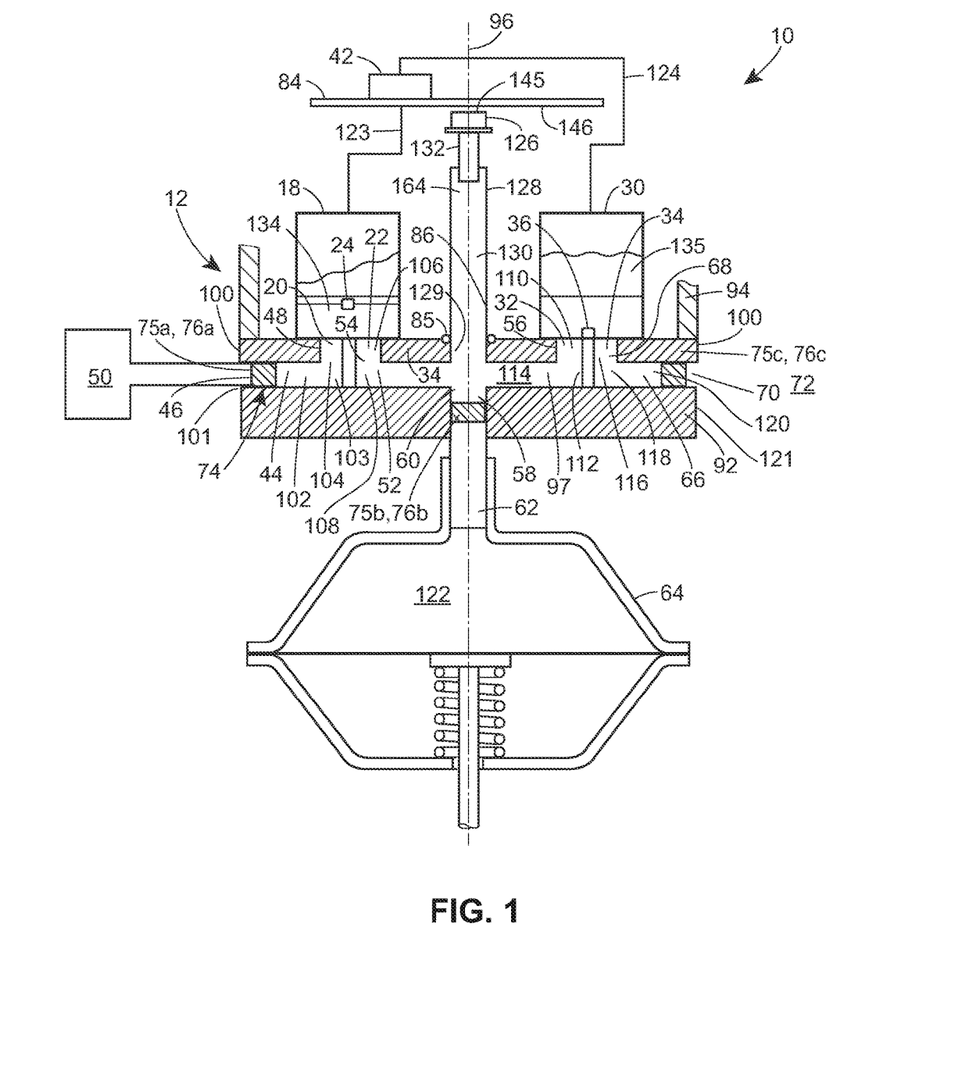
FIG. 1 is a schematic view of an embodiment of an electro-pneumatic controller.

As illustrated in FIG. 1, an electro-pneumatic controller 10 adapted to use a non-inert fluid as a control fluid includes a housing assembly 12 having a base portion 92 and a cap portion 94 removably secured to the base portion 92, the cap portion 94 having an interior 93. The electro-pneumatic controller 10 also includes a first solenoid valve 18 coupled to the base portion 92 and disposed at least partially within the interior 93 of the cap portion 94. The first solenoid valve 18 includes an inlet 20, an outlet 22, and a valve member 24 movable between a closed position 26 to an open position 28 (illustrated in FIGS. 4B and 4A, respectively). In the closed position 26 illustrated in FIG. 4B, flow from the inlet 20 to the outlet 22 is prevented and in the open position 28, flow from the inlet 20 to the outlet 22 is allowed. With reference to FIG. 1, the electro-pneumatic controller 10 further includes a second solenoid valve 30 coupled to the base portion 92 and disposed at least partially within the interior 93 of the cap portion 94. The second solenoid valve 30 includes an inlet 32, an outlet 34, and a valve member 36 movable between a closed position 38 to an open position 40 (illustrated in FIGS. 5B and 5A, respectively). In the closed position 38 illustrated in FIG. 5B, flow from the inlet 32 to the outlet 34 is prevented and in the open position 40, flow from the inlet 32 to the outlet 34 is allowed.

Referring to FIG. 1, the electro-pneumatic controller 10 also includes a processor 42 disposed at least partially within the interior 93 of the cap portion 94, the processor 42 in communication with the first solenoid valve 18 and/or the second solenoid valve 30. The processor 42 is adapted to send a command to the first solenoid valve 18 to move from the closed position 26 to the open position 28 or from the open position 28 to the closed position 26 and a command to the second solenoid valve 30 to move from the closed position 38 to the open position 40 or from the open position 40 to the closed position 38.

The electro-pneumatic controller 10 additionally includes an input passageway 44 disposed at least partially through the base portion 92 of the housing assembly 12, as illustrated in FIG. 1. The input passageway 44 has a first end 46 and a second end 48, the first end 46 is coupled to a source 50 of fluid and the second end 48 is coupled to the inlet 20 of the first solenoid valve 18. An intermediate passageway 52 is disposed at least partially through the base portion 92 of the housing assembly 12, and the intermediary passageway 52 has a first end 54 and a second end 56, the first end 54 being coupled to the outlet 22 of the first solenoid valve 18 and the second end 56 being coupled to the inlet 32 of the second solenoid valve 30. An outlet passageway 58 is disposed at least partially through the base portion 92 of the housing assembly 12, and the outlet passageway 58 having a first end 60 and a second end 62, the first end 60 of the outlet passageway 58 being coupled to the intermediate passageway 52 and the second end 62 of the outlet passageway 58 adapted to be coupled to a pneumatic actuator 64. An exhaust passageway 66 is disposed at least partially through the base portion 92 of the housing assembly 12, the exhaust passageway 66 having a first end 68 and a second end 70, the first end 68 being coupled to the outlet 34 of the second solenoid valve 30 and the second end 70 being coupled to atmosphere 72.

Still referring to FIG. 1, the electro-pneumatic controller 10 additionally includes a flameproof barrier assembly 74 including a plurality of flameproof joints 75. More specifically, a first flameproof joint 75a is disposed within the input passageway 44, a second flameproof joint 75b is disposed within the outlet passageway 58, and a third flameproof joint 75c is disposed within the exhaust passageway 66. The plurality of flame proof joints 75 cooperating to at least partially defining a first zone 14 (FIG. 7), the flameproof joints 75 being adapted to prevent or to limit the spread of an open fire or explosion that might occur due to the ignition of the non-inert control fluid. With the flameproof barrier assembly 74 disposed as described and the first zone 14 defined as described, an off-the-shelf electro-pneumatic controller 10 that is not certified use a non-inert control fluid can be retrofitted to be use such a non-inert control fluid.

Figure 2A:
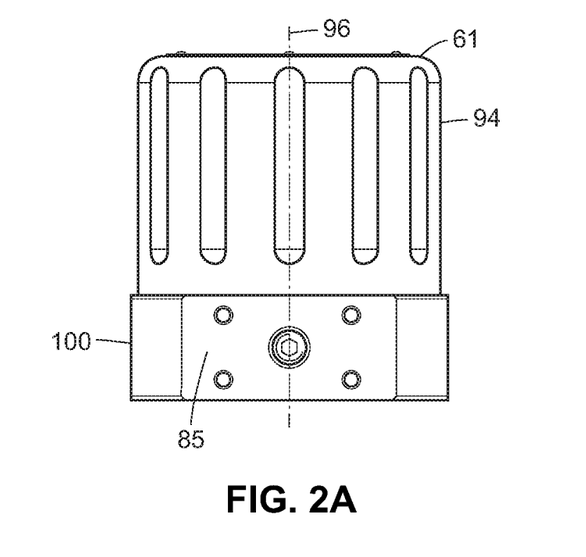
FIG. 2A is a front view of an embodiment of an electro-pneumatic controller.
Figure 2B:
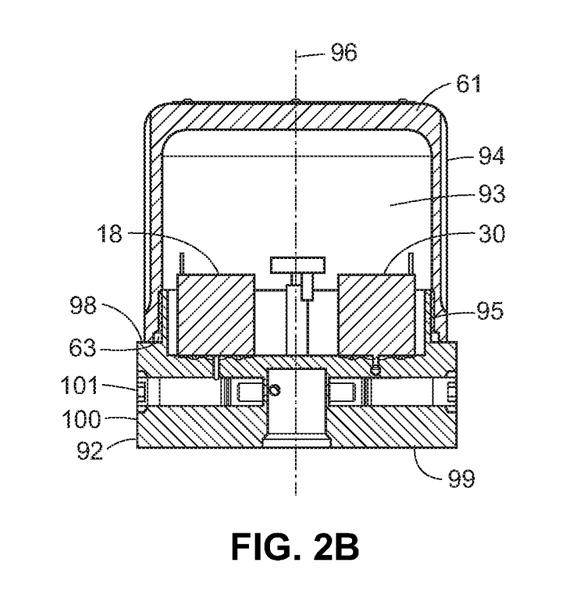
FIG. 2B is a sectional view of the embodiment of the electro-pneumatic controller illustrated in FIG. 2A taken along line S-S.

Turning to the electro-pneumatic controller 10 in more detail, and with reference to FIGS. 2A and 2B, the housing assembly 12 may include the base portion 92 and the cap portion 94 secured to the base portion 92. As illustrated in FIG. 2B, the cap portion 94 may have one or more interior walls that cooperate to define the interior 93 that may contain at least a portion of the first solenoid valve 18, the second solenoid valve 30, and/or the processor 42. In some embodiments, the cap portion 94 may have a cylindrical shape or a substantially cylindrical shape that extends along a longitudinal axis 96 from a closed first end 61 to an open second end 63. The cap portion 94 may be made or fabricated from any suitable material, such as plastic, steel (e.g., stainless steel), or aluminum, for example. The cap portion 94 may be removably secured to the base portion 92 in any known manner. For example, the open second end 63 of the cap portion 94 may be sized to receive an annular flange 95, and the open second end 63 may be coupled to the annular flange 95 (e.g., by a threaded connection) and/or to one or more portions of the base portion 92 (e.g., by mechanical fasteners).

As illustrated in FIG. 2B, the base portion 92 may also extend along the longitudinal axis 96 from a first end 98 to a second end 99, and the open second end 63 of the cap portion 94 may be adjacent to the first end 98 when the cap portion 94 is secured to the base portion 92. The base portion 92 may be made or fabricated from any suitable material, such as plastic, steel (e.g., stainless steel), or aluminum, for example. As illustrated in FIG. 1, the base portion 92 may include a plurality of passageways 97, such as the input passageway 44, the intermediate passageway 52, the outlet passageway 58, and/or the exhaust passageway 66. All or a portion of the plurality of passageways 97 may be disposed through or within the base portion 92. The plurality of passageways 97 (or each of the plurality of passageways 97) may have any suitable cross-sectional shapes and/or dimensions or combinations of shapes and/or dimensions. For example, each of the plurality of passageways 97 may have a circular cross-sectional shape.

Referring to FIG. 1, the plurality of passageways 97 may include the input passageway 44, and all or a portion of the input passageway 44 disposed at least partially through the base portion 92. The input passageway 44 may include the first end 46 that may be coupled to the source 50 of the fluid (e.g., a non-inert gas, such as natural gas), and the first end 46 may be disposed at or adjacent to a first portion 101 of a lateral surface 100 of the base portion 92. The input passageway 44 may include a first segment 102 that may be linear and may extend through the base portion 92 normal (or substantially normal) to the longitudinal axis 96 from the first end 46 to a corner portion 103. The input passageway 44 may also include a second segment 104 that may be linear and may extend through the base portion 92 along (or substantially along) the longitudinal axis 96 from the corner portion 103 to the second end 48. The second end 48 may be coupled to the inlet 20 of the first solenoid valve 18.

The plurality of passageways 97 may also include the intermediate passageway 52 that may be disposed at least partially within the base portion 92, and all or a portion of the intermediate passageway 52 may be disposed at least partially through the base portion 92 of the housing assembly 12. The intermediary passageway 52 may extend from the first end 54 coupled to the outlet 22 of the first solenoid valve 18 and the second end 56 coupled to the inlet 32 of the second solenoid valve 30. More specifically, as illustrated in FIG. 1, the intermediary passageway 52 may include a first segment 106 that extends from the first end 54 to a first corner portion 108, and the first segment 106 may be linear (or substantially linear) and may extend along (or substantially along) the longitudinal axis 96 from the first end 54 to the first corner portion 108 to the second end 56. The intermediary passageway 52 may also include a second segment 110 that extends from the second end 56 to a second corner portion 112, and the second segment 110 may be linear (or substantially linear) and may extend along (or substantially along) the longitudinal axis 96 from the second end 56 to the second corner portion 112. The intermediary passageway 52 may further include a third segment 114 that extends between the first segment 106 and the second segment 110 between the first corner portion 108 and the second corner portion 112, and the third segment 114 may be normal (or substantially normal) to the longitudinal axis 96.

The plurality of passageways 97 may also include the outlet passageway 58 that may be disposed at least partially within the base portion 92, and all or a portion of the outlet passageway 58 may be disposed at least partially through the base portion 92 of the housing assembly 12. The outlet passageway 58 may be coupled to the intermediate passageway 52 and a volume 122 of the pneumatic actuator 64 of, for example, a control valve (not shown). More specifically, the outlet passageway 58 may include the first end 60 that is coupled to the third segment of the intermediate passageway 52 between (e.g., midway between) the first corner portion 108 and the second corner portion 112. The second end 62 of the outlet passageway 58 adapted to be coupled to the volume 122 of the pneumatic actuator 64, and the outlet passageway 58 may be linear and parallel to (or coaxially-aligned with) the longitudinal axis 96.

The plurality of passageways 97 may also include the exhaust passageway 66, and all or a portion of the exhaust passageway 66 may be disposed at least partially through the base portion 92 of the housing assembly 12. The exhaust passageway 66 may include the first end 68 that may be coupled to the outlet 34 of the second solenoid valve 30. The exhaust passageway 66 may include a first segment 116 that may be linear and may extend through the base portion 92 along (or substantially along) the longitudinal axis 96 from the first end 68 to a corner portion 118. The exhaust passageway 66 may also include a second segment 120 that may be linear and may extend through the base portion 92 normal (or substantially normal) to the longitudinal axis 96 from the corner portion 118 to the second end 70. The second end 70 may be coupled to the atmosphere 72, and the second end 70 may be disposed at or adjacent to a second portion 121 of the lateral surface 100 of the base portion 92.

The electro-pneumatic controller 10 may also include the processor 42 in communication with the first solenoid valve 18 and/or the second solenoid valve 30. The processor 42 may be in communication (e.g., hardwire communication or wireless communication) with one or more devices (not shown) located remote from the electro-pneumatic controller 10. The processor 42 may be mounted to a circuit board 84 disposed within the interior 93 of the cap portion 94. The circuit board 84 may be disposed adjacent to or offset from a top portion of each of the first solenoid valve 18 and/or the second solenoid valve 30, and the circuit board 84 may be normal to the longitudinal axis 96.

Figure 4A:
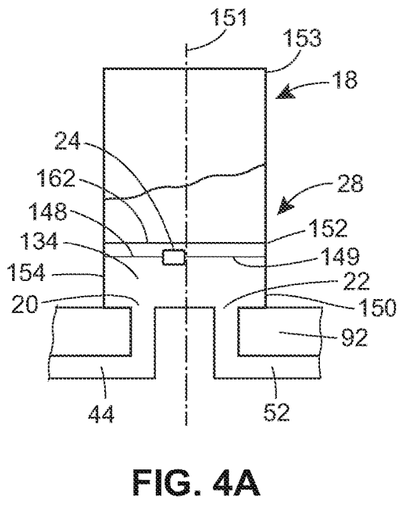
FIG. 4A is a section view of an embodiment of a first solenoid valve in an open position.
Figure 4B:
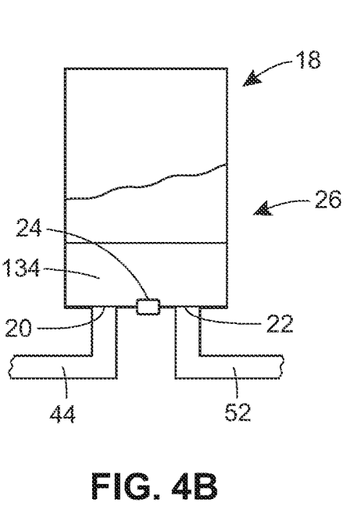
FIG. 4B is a section view of the first solenoid valve of FIG. 4A in a closed position.

The first solenoid valve 18 may be secured or coupled to the base portion 92, and the first solenoid valve 18 may be disposed within the interior 93 of the cap portion 94. The first solenoid valve 18 may have the inlet 20 that is in communication with the second end 48 of the input passageway 44 and the outlet 22 that is in communication with the first end 54 of the intermediate passageway 52. The first solenoid valve 18 also has the valve member 24 movable between the closed position 26 (see FIG. 4B) to the open position 28 (see FIG. 4A), and the first solenoid valve 18 may be a normally closed valve. Referring to FIG. 4A, the first solenoid valve 18 may also have an interior portion 134 that may be a volume in the interior of the first solenoid valve 18 in fluid communication with the inlet 20 and the outlet 22 when the valve member 24 is in the open position 28. More specifically, the interior portion 134 that may be a volume that extends longitudinally (along an axis 151 that may be parallel to the longitudinal axis 96) from a first end 150 of the first solenoid valve 18 (e.g., a point adjacent to the inlet 20 and/or the outlet 22) to a point 152 disposed between the first end 150 and a longitudinally-opposite second end 153. A transverse wall 162 may extend through or adjacent to the point 152, and the transverse wall 162 may be normal (or substantially normal) to the axis 151. The interior portion 134 may be further defined by one or more lateral walls 154 that may extend along (or substantially along) the axis 151. The interior portion 134 may include all or a portion of a diaphragm 148 that may be secured to (or be a part of) the valve member 24. In some examples, the interior portion 134 may be partially defined by a bottom surface 149 of the diaphragm 148, and because the diaphragm translates along the axis 151, the interior portion 134 may also change shape as the diaphragm 148 translates. In other embodiments, the point 152 is vertically above the diaphragm 148 and the interior portion 134 is a fixed volume. In the closed position 26, flow from the inlet 20 to the outlet 22 may be prevented. In the open position 28, flow from the inlet 20 to the outlet 22 (e.g., flow through the inlet 20, into the interior portion 134, and out of the outlet 22) may be allowed.

Figure 6A:
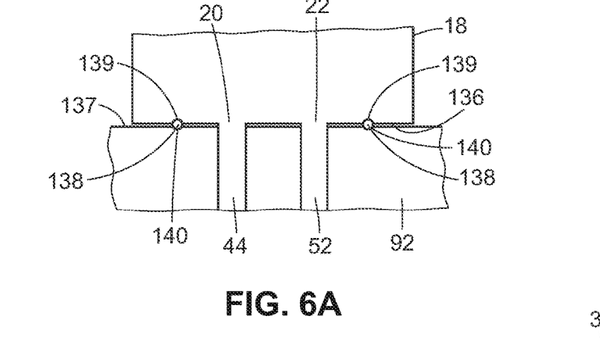
FIG. 6A is a section view of an embodiment of a first solenoid valve coupled to the base portion.

As illustrated in FIG. 6A, a bottom surface 136 of the first solenoid valve 18 may be disposed on or adjacent to a first portion of a top surface 137 of the base portion 92, and a seal 138 (e.g., an O-ring) may be disposed between the bottom surface 136 of the first solenoid valve 18 and the top surface 137 of the base portion 92. The seal 138 may be (at least partially) disposed in a groove 139, 140 formed in each of the bottom surface 136 of the first solenoid valve 18 and the top surface 137 of the base portion 92, respectively. The grooves 139, 140 and the seal 138 may have a circular shape (when viewed normal to the top surface 137 of the base portion 92) and the grooves 139, 140 and the seal 138 may surround the outlet 22 and inlet 20 of the first solenoid valve 18 to prevent leakage of fluid (flowing from the inlet 20 to the outlet 22 of the first solenoid valve 18) between the gap formed between the bottom surface 136 of the first solenoid valve 18 and the top surface 137 of the base portion 92. The first solenoid valve 18 may include components made of carbon steel (e.g., chrome plated carbon steel) and/or brass (chrome plated brass).

The first solenoid valve 18 may be in communication with the processor 42 (e.g., by a communication line 123), which may provide one or more signals to move the valve member 24 from the open position 28 to the closed position 26 and/or from the closed position 26 to the open position 28. For example, the processor 42 may provide a first signal to move the valve member 24 from the closed position 26 to the open position 28 and/or a second signal to move the valve member 24 from the open position 28 to the closed position 26.

Figure 5A:
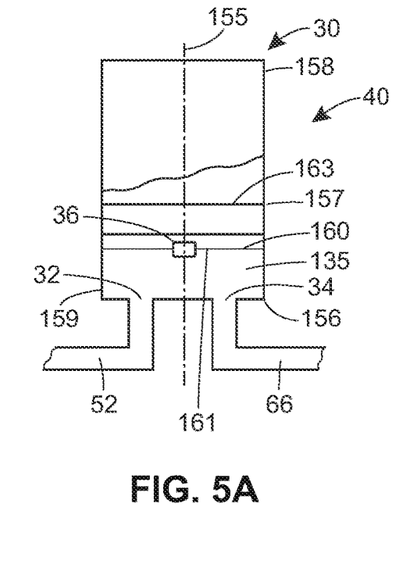
FIG. 5A is a section view of an embodiment of a second solenoid valve in an open position.
Figure 5B:
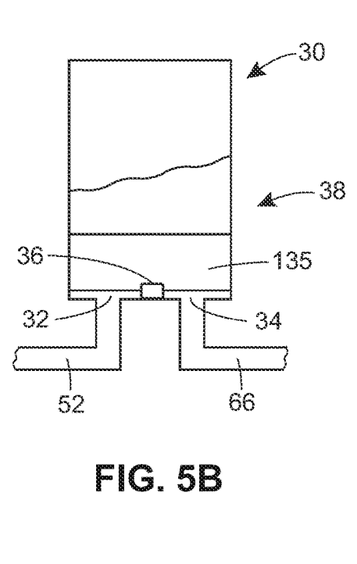
FIG. 5B is a section view of the second solenoid valve of FIG. 5A in a closed position.

The second solenoid valve 30 may have the inlet 32 that is in communication with the second end 56 of the intermediate passageway 52 and the outlet 34 that is in communication with the first end 68 of the exhaust passageway 66. The second solenoid valve 30 also has the valve member 36 movable between the closed position 38 (Illustrated in FIG. 5B) to the open position 40 (illustrated in FIG. 5A), and the second solenoid valve 30 may be a normally closed valve. Referring to FIG. 5A, the second solenoid valve 30 may also have an interior portion 135 that may be a volume in the interior of the second solenoid valve 30 in fluid communication with the inlet 32 and the outlet 34 when the valve member 36 is in the open position 40. More specifically, the interior portion 135 that may be a volume that extends longitudinally (along an axis 155 that may be parallel to the longitudinal axis 96) from a first end 156 of the second solenoid valve 30 (e.g., a point adjacent to the inlet 32 and/or the outlet 34) to a point 157 disposed between the first end 156 and a longitudinally-opposite second end 158. A transverse wall 163 may extend through or adjacent to the point 157, and the transverse wall 163 may be normal (or substantially normal) to the axis 155. The interior portion 135 may be further defined by one or more lateral walls 159 that may extend along (or substantially along) the axis 155. The interior portion 135 may include all or a portion of a diaphragm 160 that may be secured to (or be a part of) the valve member 36. In some examples, the interior portion 135 may be partially defined by a bottom surface 161 of the diaphragm 160, and because the diaphragm translates along the axis 155, the interior portion 135 may also change shape as the diaphragm 160 translates. In other embodiments, the point 157 is vertically above the diaphragm 160 and the interior portion 135 is a fixed volume. In the closed position 38, flow from the inlet 32 to the outlet 34 is prevented. In the open position 40, flow from the inlet 32 to the outlet 34 (e.g., flow through the inlet 32, into the interior portion 135, and out of the outlet 34) is allowed.

Figure 6B:
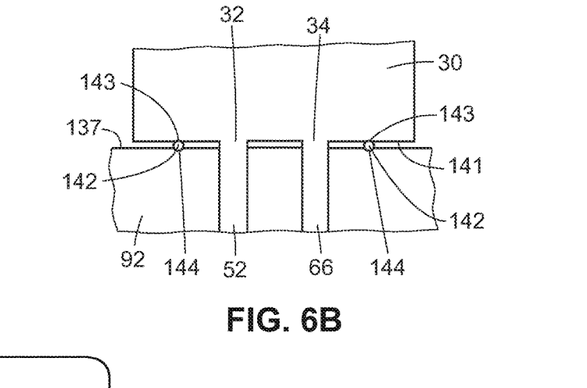
FIG. 6B is a section view of an embodiment of a second solenoid valve coupled to the base portion.

As illustrated in FIG. 6B, a bottom surface 141 of the second solenoid valve 30 may be disposed on or adjacent to a second portion of a top surface 137 of the base portion 92, and a seal 142 (e.g., an O-ring) may be disposed between the bottom surface 141 of the second solenoid valve 30 and the top surface 137 of the base portion 92. The seal 142 may be (at least partially) disposed in a groove 143, 144 formed in each of the bottom surface 141 of the second solenoid valve 30 and the top surface 137 of the base portion 92, respectively. The grooves 143, 144 and the seal 142 may have a circular shape (when viewed normal to the top surface 137 of the base portion 92) and the grooves 143, 144 and the seal 142 may surround the outlet 34 and inlet 32 of the second solenoid valve 30 to prevent leakage of fluid (flowing from the inlet 32 to the outlet 34 of the second solenoid valve 30) between the gap formed between the bottom surface 141 of the second solenoid valve 30 and the top surface 137 of the base portion 92.

The second solenoid valve 30 may be in communication with the processor 42 (e.g., by a communication line 124), which may provide one or more signals to move the valve member 24 from the open position 40 to the closed position 38 and/or from the closed position 38 to the open position 40. For example, the processor 42 may provide a first signal to move the valve member 36 from the closed position 38 to the open position 40 and/or a second signal to move the valve member 36 from the open position 40 to the closed position 38. The second solenoid valve 30 may include components made of carbon steel (e.g., chrome plated carbon steel) and/or brass (chrome plated brass).

One or more pressure transducers 126 may be coupled to or in communication with the processor 42, and the one or more pressure transducers 126 (or pressure sensors) may be adapted to measure pressure in a desired portion(s) of one or all of the plurality of passageways 97. Any suitable type of pressure transducer 126 may be used, such as a pressure transducer 126 having a ceramic type material used for the diaphragm. In some embodiment, a pressure transducer 126 may be positioned or disposed to measure pressure in the intermediate passageway 52 and/or outlet passageway 58. For example, as illustrated in FIG. 1, a cylindrical tube 128 having a tube passageway 164 may be secured to the base portion 92 adjacent to an aperture of a passageway 129 of the base portion 92 that is in communication with the intermediate passageway 52 and/or outlet passageway 58, and a seal 85 (e.g., an O-ring) may be disposed around a portion (e.g., an end portion 86) of the cylindrical tube 128 at or adjacent to (and may sealingly engage) a portion of the base portion 92 at or adjacent to the passageway 129 of the base portion 92. The seal 85 may prevent leaking of control fluid flowing from the passageway 129 of the base portion 92 to the tube passageway 164 defined by the cylindrical tube 128. The tube passageway 164 of the cylindrical tube 128 and the passageway 129 may (at least partially) define a transducer passageway 130 that be in communication with the intermediate passageway 52 and/or outlet passageway 58 and that may extend vertically upward and parallel to or along the longitudinal axis 96. The pressure transducer 126 may be secured or coupled to the cylindrical tube 128 and may be disposed at or adjacent to an end portion 132 of the transducer passageway 130, and a top portion 145 of the transducer 126 may be disposed adjacent to a bottom portion 146 of the circuit board 84. The one or more pressure transducers 126 may be any type of transducer or sensor known in the art, such as a digital, analog, and/or mechanical sensor.

The electro-pneumatic controller 10 may be a proportional-integral-derivative ("PID") controller that calculates an error value as the difference between a measured process variable and a desired setpoint, and the PID controller attempts to minimize the error by adjusting the process through use of a manipulated variable. To this end, when it is desired to increase pressure in the volume 122 of the actuator 64, the processor 42 sends an appropriate signal open the first solenoid valve 18 and to close the second solenoid valve 30. Consequently, the valve member 24 of the first solenoid valve 18 is moved to the open position 28, allowing fluid from the source 50 to travel through the input passageway 44, through the intermediate passageway 52, through the outlet passageway 58, and into the volume 122 of the pneumatic actuator 64, thereby increasing pressure inside the volume 122. When the valve member 36 of the second solenoid valve 30 is moved to the closed position 38, fluid from the volume 122 of the actuator 64 is prevented from flowing through the second solenoid valve 30 and venting through the atmosphere 72.

When it is desired to decrease pressure in the volume 122 of the actuator 64, the processor 42 sends an appropriate signal close the first solenoid valve 18 and to open the second solenoid valve 30. Consequently, the valve member 24 of the first solenoid valve 18 is moved from the open position 28 to the closed position 26, preventing fluid from the source 50 from traveling through the input opening 44, the intermediate passageway 52, the outlet passageway 58, and into the volume 122 of the pneumatic actuator 64. When the valve member 36 of the second solenoid valve 30 is moved to the closed position 38 to the open position 40, fluid from the volume 122 of the actuator 64 is allowed to flow from the outlet passageway 58, the intermediate passageway 52, and the exhaust passageway 66 to vent to the atmosphere 72. By adjusting the pressure in the volume 122 of the pneumatic actuator 64 as described, a position of a valve member (not shown) of a control valve (not shown) can be precisely controlled.

In some applications, the source 50 may include a non-inert control fluid (for example, natural gas). Because the non-inert control fluid may be flammable, precautions must be taken to prevent the ignition of the non-inert control fluid. For example, the processor 42 and associated electronics disposed within the housing assembly 12 (e.g., within the interior 93 of the cap portion 94) may be intrinsically-safe, which means that the associated voltages and/or currents are regulated to a maximum value that is below a value that would ignite the non-inert control fluid. However, such intrinsically-safe electronics may require a significant redesign of the existing non-intrinsically-safe electronics that are provided with a conventional controller, and therefore providing intrinsically-safe electronics significantly increases the cost of the controller. Instead of providing intrinsically-safe electronics, a flameproof barrier may be disposed within the housing assembly 12 (which contains the processor 42, communication lines 123, 124, and associated electronics), and, specifically, at least partially within the plurality of passageways 97 disposed within the housing assembly 12. The flameproof barrier assembly 74 prevents the combustion of an explosion from escaping outside of a barrier in the event that the non-inert control fluid is ignited by the processor 42 or associated electronics.

Figure 3A:
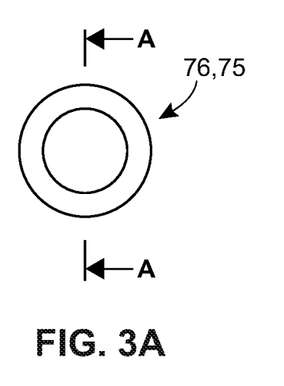
FIG. 3A is a front view of an embodiment of a flameproof joint.
Figure 3B:
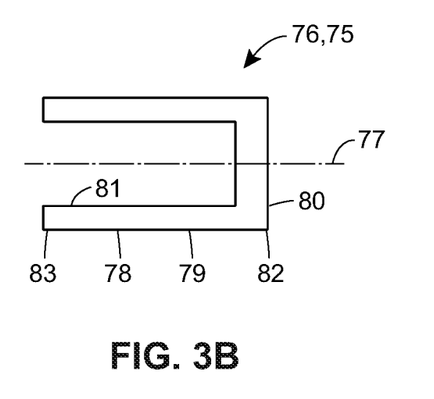
FIG. 3B is a sectional view of the embodiment of the flameproof joint illustrated in FIG. 3A and taken along line A-A.

Accordingly, in some embodiments of the electro-pneumatic controller 10 using a non-inert gas as a control fluid, the flameproof barrier assembly 74 may include one or more flameproof joints 75, as illustrated in FIG. 1. Each of the flame proof joints 75 may be disposed within a desired one of the plurality of passageways 97 to prevent or to limit the spread of an open fire or explosion that might occur due to the ignition of the non-inert process fluid. Each flameproof joint 75 may be a flame arrestor 76. The flame arrestor 76 functions by absorbing the heat from a flame front traveling at sub-sonic velocities, thus dropping the burning gas/air mixture below its auto-ignition temperature and extinguishing the flame. Each flame arrestor 76, as illustrated in FIGS. 3A and 3B, may be elongated and extend along an axis 77 from a first end 82 to an open second end 83, and the distance between the flat end 82 to the second end 83 may be 9.5 mm. Each flame arrestor 76 may be shaped and dimensioned along that axis to fit tightly within a desired portion of any of the plurality of passageways 97 (e.g., the passageway 44, 52, 58, 66).

As illustrated in FIG. 3B, each flame arrestor 76 may have an outer wall 78 that may be elongated and may extend along the axis 77 from the first end 82 to the second end 83 of the flame arrestor 76, and the outer wall 78 may have the shape of a cylinder. The outer wall 78 may be sized and dimensioned to fit tightly in a desired portion of any of the plurality of passageways 97, and a cross-sectional shape of an exterior surface 79 of the outer wall 78 may correspond to the interior shape of the one of the plurality of passageways 97 in which the flame arrestor 76 is disposed. A cross sectional shape of an inner surface 81 inwardly offset from the exterior surface 79 may also correspond to the shape of the exterior surface 79. For example, each of the cross-sectional shapes of the exterior surface 79 and inner surface 81 of the outer wall 78 and the interior shape of the one of the plurality of passageways 97 may be circular. A gap between the outer wall 78 and a wall forming the passageways 97 in which the flame arrestor 76 is disposed may have a maximum value of 0.1 mm. An end wall 80 may be disposed at the first end 82 of the flame arrestor 76, and the end wall may be normal to the axis 77. The entire flame arrestor 76 may be a single, unitary component and may be made by a sintering process (i.e., may be a sintered component). That is, a fine metal powder (e.g., sintered metal 316L SST having a minimum density of 45%) may be compressed in a press to create the "cup" shape of the end wall 80 and outer wall 78. The semi-complete flame arrestor 76 is then heat treated to maintain the "cup" shape. In the finished, sintered flame arrestor 76, the maximum pore size may be 62 micrometers and the nominal pore size may be 20 micrometers. Smaller maximum pore sizes are also possible, as are smaller nominal pore sizes (e.g., between 20 and 10 micrometers). The heat of the flame resulting from the ignited non-inert gas may be absorbed through the pores formed in the sintered end wall 80 of the flame arrestor 76, and a pressure drop across the sintered end wall 80 may also prohibit or reduce flame propagation through the flame arrestor 76. Each flame arrestor may be secured within a desired portion of any of the plurality of passageways 9, (e.g., the passageway 44, 52, 58, 66) in any manner known in the art. For example, a snap ring (not shown) may be disposed around an outer circumferential portion of the exterior surface 79 of the outer wall 78, and the snap ring may engage a circumferential groove formed in a desired portion f any of the plurality of passageways 97.

As illustrated in FIG. 1, a first flame proof joint 75a (e.g., a first flame arrestor 76a) may be disposed in the input passageway 44. The first flame proof joint 75a may be disposed within the first segment 102 of the input passageway 44, and the first flame proof joint 75a may be adjacent to the first end 46 of the input passageway 44. A second flame proof joint 75b (e.g., a second flame arrestor 76b) may be disposed within the outlet passageway 58, and the second flame proof joint 75b may be disposed between the first end 60 and the second end 62. A third flame proof joint 75c (e.g., a third flame arrestor 76c) may be disposed in the exhaust passageway 66. The third flame proof joint 75c may be disposed within the second segment 120 of the exhaust passageway 66, and the third flame proof joint 75c may be adjacent to the second end 70 of the exhaust passageway 66.

Figure 7:
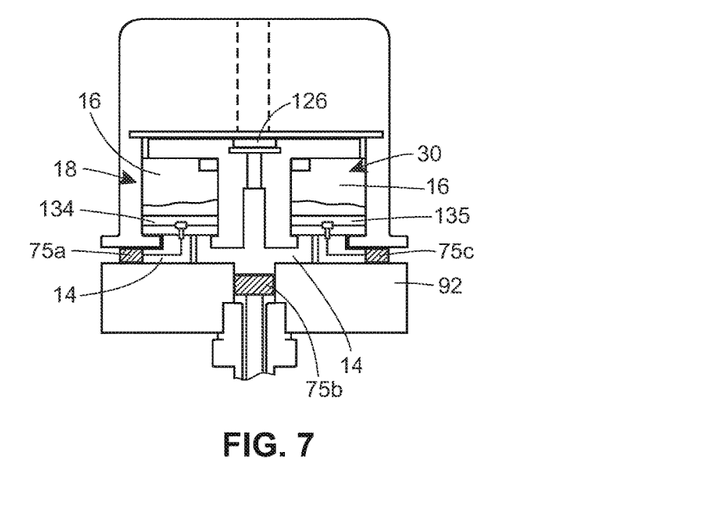
FIG. 7 is a schematic view of an embodiment of an electro-pneumatic controller illustrating the first zone and the second zone.

The position of the flame proof joints 75 (e.g., the first, second, and third flame proof joints 75a, 75b, 75c) within a desired one of the plurality of passageways 97 (e.g., passageways 44, 58, 66) at least partially defines the first zone 14 within at least a portion of the plurality of passageways 97 (e.g., a portion of the plurality of passageways 97 in which non-inert control fluid is present and is capable of igniting). As illustrated in FIGS. 1 and 7, the first zone 14 may thus comprise or include all or a portion of the input passageway 44 (e.g., a portion of the input passageway 44 between the first flame proof joint 75a and the second end 48 of the input passageway 44), all or a portion of the intermediate passageway 52 (e.g., between the first end 54 and the second end 56 of the intermediate passageway 52), all or a portion of the outlet passageway 58 (e.g., a portion of the outlet passageway 58 between the second flame proof joint 75b and the first end 60 of the outlet passageway 58), and all or a portion of the exhaust passageway 66 (e.g., a portion of the exhaust passageway 66 between the first end 68 and the third flame proof joint 75c).

Still referring to FIGS. 1 and 7, the first zone 14 may also comprise or include all or a portion of the interior portion 134 of the first solenoid valve 18 and all or a portion of the inlet 20 and/or the outlet 22 (i.e., the passageways or channels of the first solenoid valve 18 that define or at least partially define all or a portion of the inlet 20 and/or the outlet 22). The first zone 14 may further comprise or include all or a portion of the interior portion 135 of the second solenoid valve 30 and all or a portion of the inlet 32 and/or the outlet 34 (i.e., the passageways or channels of the second solenoid valve 30 that define or at least partially define all or a portion of the inlet 32 and/or the outlet 34). The first zone 14 may also comprise or include all or a portion of the transducer passageway 130 (e.g., all or a portion of the tube passageway 164 of the cylindrical tube 128 and the passageway 129 of the base portion 92). For example, the first zone 14 may include all or a portion of the transducer passageway 130 from the intermediate passageway 52 and/or outlet passageway 58 up to or adjacent to the end portion 132. The first zone 14 may also include all or a portion of the pressure transducer 126.

The flame proof joints 75 (e.g., the first, second, and third flame proof joints 75a, 75b, 75c) may be positioned at portions of the plurality of passageways 97 that are in communication with components that can be catastrophically harmed by the propagation of flames due to ignition. For example, the first flame proof joint 75a may be disposed within the first segment 102 of the input passageway 44 to prevent flames from propagating towards the source 50 of the non-inert control fluid. The second flame proof joint 75b may be disposed within the outlet passageway 58 to prevent flames from propagating towards the actuator 64 and control valve (not shown). The third flame proof joint 75c (e.g., a third flame arrestor 76c) may be disposed in the exhaust passageway 66 to prevent flames from propagating towards the atmosphere 72. Any further flame proof joints 75 may be included or positioned in any further one of the plurality of passageways 97 (including passages that are not expressly disclosed, such as passageways extending through the base portion 92 to accommodate pressure sensors or transducers) to prevent flames from propagating through that passageway.

So configured, both a partition wall and a flameproof joint may be defined at least partially by the flameproof barrier assembly 74. Specifically, the flame arrestors 76 (and associated snap rings) may define the flameproof joint 75. The partition wall may be defined by all or portions of the base portion 92, the first solenoid valve 18, the second solenoid valve 30, seals 85 (disposed around a portion of the cylindrical tube 128), seals 138, 142 (disposed between the first and second solenoid valves 18, 30, and the base portion), the tube 128, and/or the transducer 126. The partition wall and the flameproof joints may cooperate to define the first zone 14. A second zone 16 is therefore created outside of the boundaries of the first zone 14, and the second zone 16 may include all or portions of the first solenoid valve 18 exterior to the interior portion 134 and all or portions of the second solenoid valve 30 exterior to the interior portion 135.

With the flameproof barrier assembly 74 disposed as described and the first zone 14 and second zone 16 defined as described, an off-the-shelf electro-pneumatic controller 10 that is not certified use a non-inert control fluid can be retrofitted to be use such a non-inert control fluid. Accordingly, if the only available (or economically-feasible) control fluid is a non-inert control fluid (for example, natural gas), one or more off-the-shelf electro-pneumatic controllers 10 can be quickly and economically modified without having to switch the existing electronics out with expensive intrinsically-safe electronics. Moreover, the flameproof joints 75 all or in part provide and define a certified barrier between the first zone 14 (also known as "Zone 0") and the second zone 16 (also known as "Zone 1"), consistent with IEC 60079-0, 60079-1, and 60079-26 standards.

While various embodiments have been described above, this disclosure is not intended to be limited thereto. Variations can be made to the disclosed embodiments that are still within the scope of the appended claims.

What is claimed is:

1. An electro-pneumatic controller adapted to use a non-inert fluid as a control fluid, the electro-pneumatic controller comprising:
   a housing assembly having a base portion and a cap portion removably secured to the base portion, the cap portion having an interior;
   a first solenoid valve coupled to the base portion and disposed at least partially within the interior of the cap portion, the first solenoid valve having an inlet, an outlet, and a valve member movable between a closed position and an open position, wherein in the closed position, flow from the inlet to the outlet is prevented and in the open position, flow from the inlet to the outlet is allowed;
   a second solenoid valve coupled to the base portion and disposed at least partially within the interior of the cap portion, the second solenoid valve having an inlet, an outlet, and a valve member movable between a closed position and an open position, wherein in the closed position, flow from the inlet to the outlet is prevented and in the open position, flow from the inlet to the outlet is allowed;

a processor disposed within the interior of the cap portion, the processor in communication with the first solenoid valve and the second solenoid valve, the processor adapted to send a command to the first solenoid valve to move from the closed position to the open position or from the open position to the closed position and a command to the second solenoid valve to move from the closed position to the open position or from the open position to the closed position;

an input passageway disposed at least partially through the base portion, the input passageway having a first end and a second end, the first end coupled to a source of the non-inert fluid and the second end coupled to the inlet of the first solenoid valve;

an intermediate passageway disposed at least partially through the base portion, the intermediary passageway having a first end and a second end, the first end being coupled to the outlet of the first solenoid valve and the second end being coupled to the inlet of the second solenoid valve;

an outlet passageway disposed at least partially through the base portion, the outlet passageway having a first end and a second end, the first end of the outlet passageway being coupled to the intermediate passageway and the second end of the outlet passageway adapted to be coupled to a pneumatic actuator;

an exhaust passageway disposed at least partially through the base portion, the exhaust passageway having a first end and a second end, the first end being coupled to the outlet of the second solenoid valve and the second end being coupled to atmosphere; and a flameproof barrier assembly including a plurality of flameproof joints, wherein a first flameproof joint is disposed within the input passageway, a second flameproof joint is disposed within the outlet passageway, and a third flameproof joint is disposed within the exhaust passageway, the plurality of flameproof joints cooperating to at least partially define a first zone, the flameproof joints adapted to prevent or to limit the spread of an open fire or explosion that might occur due to the ignition of the non-inert control fluid.

2. The electro-pneumatic controller of claim 1, wherein each of the flameproof joints is a flame arrestor.

3. The electro-pneumatic controller of claim 2, wherein each flame arrestor includes an elongated outer wall that extends along an axis from a first end to a second end of the flame arrestor, and an end wall may be disposed at the first end of flame arrestor.

4. The electro-pneumatic controller of claim 2, wherein each flame arrestor is a single, unitary component that is made by a sintering process.

5. The electro-pneumatic controller of claim 1, wherein the processor is non-intrinsically safe.

6. The electro-pneumatic controller of claim 1, wherein the first solenoid valve is a normally closed valve and the second solenoid valve is a normally closed valve.

7. The electro-pneumatic controller of claim 1, wherein the first solenoid valve has an interior portion in fluid communication with the inlet and the outlet of the first solenoid valve when the valve member of the first solenoid valve is in the open position, wherein the second solenoid valve has an interior portion in fluid communication with the inlet and the outlet of the second solenoid valve when the valve member of the second solenoid valve is in the open position, and wherein the first zone also includes the interior portion of the first solenoid valve and the interior portion of the second solenoid valve.

8. The electro-pneumatic controller of claim 1, wherein a bottom surface of the first solenoid valve is disposed on or adjacent to a first portion of a top surface of the base portion, and a first seal is disposed between the bottom surface of the first solenoid valve and the first portion of the top surface of the base portion, and wherein a bottom surface of the second solenoid valve is disposed on or adjacent to a second portion of the top surface of the base portion, and a second seal is disposed between the bottom surface of the second solenoid valve and the second portion of the top surface of the base portion.

9. The electro-pneumatic controller of claim 8, wherein each of the first seal and the second seal is an O-ring.

10. The electro-pneumatic controller of claim 1, wherein a pressure transducer measures pressure in the intermediate passageway and/or outlet passageway.

11. The electro-pneumatic controller of claim 10, wherein a cylindrical tube having a tube passageway is secured to the base portion adjacent to an aperture of a passageway of the base portion that is in communication with the intermediate passageway and/or outlet passageway, and the pressure transducer is coupled to the cylindrical tube.

12. The electro-pneumatic controller of claim 1, wherein the first flame proof joint is adjacent to the first end of the input passageway.

13. The electro-pneumatic controller of claim 1, wherein the second flame proof joint is disposed between the first end and the second end of the outlet passageway.

14. The electro-pneumatic controller of claim 1, wherein the third flame proof joint is adjacent to the second end of the exhaust passageway.

15. A method of converting an electro-pneumatic controller having non-intrinsically safe electronics to use a non-inert fluid as a control fluid, the electro-pneumatic controller including a housing assembly having a base portion and a cap portion removably secured to the base portion, a first solenoid valve and a second solenoid valve each coupled to the base portion and disposed at least partially within an interior of the cap portion, each of the first and second solenoid valves having an inlet, an outlet, and a valve member movable between a closed position and an open position, and a non-intrinsically safe processor disposed within the interior of the cap portion and in communication with each of the first and second solenoid valves, the method comprising:

positioning a first flameproof joint within an input passageway, the input passageway disposed at least partially through the base portion and having a first end coupled to a source of the non-inert fluid and a second end coupled to the inlet of the first solenoid valve;

positioning a second flameproof joint within an outlet passageway, the outlet passageway disposed at least partially through the base portion and including a first end coupled to an intermediate passageway and a second end adapted to be coupled to a pneumatic actuator, wherein the intermediate passageway is disposed at least partially through the base portion and includes a first end coupled to the outlet of the first solenoid valve and a second end coupled to the inlet of the second solenoid valve; and positioning a third flameproof joint within an exhaust passageway, the exhaust passageway disposed at least partially through the base portion and including a first end being coupled to the outlet of the second solenoid valve and a second end being coupled to atmosphere.

16. The method of claim 15, further comprising:
positioning a first seal between a bottom surface of the first solenoid valve and a first portion of a top surface of the base portion; and
positioning a second seal between a bottom surface of the second solenoid valve and a second portion of the top surface of the base portion.

17. The method of claim 16, wherein each of the first seal and the second seal is an O-ring.

18. The method of claim 15, wherein each of the flameproof joints is a flame arrestor.

19. The method of claim 18, wherein each flame arrestor includes an elongated outer wall that extends along an axis from a first end to a second end of the flame arrestor, and an end wall may be disposed at the first end of flame arrestor.

20. The method of claim 19, wherein each flame arrestor is a single, unitary component that is made by a sintering process.

* * * * *